Figure 1:
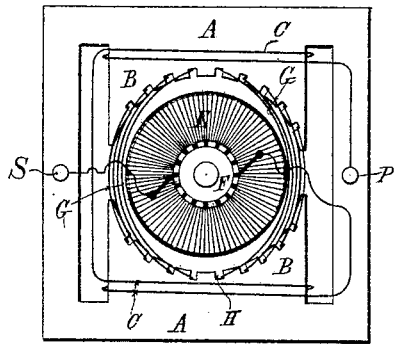

(No Model.)

W. STANLEY, Jr. & J. F. KELLY.
ALTERNATING CURRENT MOTOR.

No. 479,675. Patented July 26, 1892.

Witnesses:
Raphael Netter
James Cattow

Inventors
William Stanley Jr
and
John F. Kelly
by Duncan & Page.
Attorneys

UNITED STATES PATENT OFFICE.

WILLIAM STANLEY, JR., OF PITTSFIELD, MASSACHUSETTS, AND JOHN F. KELLY, OF NEW YORK, N. Y.

ALTERNATING-CURRENT MOTOR.

SPECIFICATION forming part of Letters Patent No. 479,675, dated July 26, 1892.

Application filed November 14, 1891. Serial No. 411,936. (No model.)

*To all whom it may concern:*

Be it known that we, WILLIAM STANLEY, Jr., residing at Pittsfield, in the county of Berkshire and State of Massachusetts, and JOHN F. KELLY, residing at New York, in the county and State of New York, citizens of the United States, have invented certain new and useful Improvements in Alternating-Current Motors, of which the following is a specification, reference being had to the drawings accompanying and forming a part of the same.

This invention relates, mainly, to electro-magnetic motors designed or adapted to be operated by alternating currents.

The special form of motor contemplated as within the limits of the applicability of the invention may be very widely varied; but for purposes of illustration the invention will be described as applied to any ordinary type of motor having a commutator and armature-winding similar to those existing in continuous-current generators and motors and a field-magnet (which should be laminated or magnetically subdivided) energized by coils in series with or in derivation to the armature-circuit. If an alternating current be caused to flow through the armature-coils of such a motor, it will, as is well understood, be subject to a given retardation, due to the self-induction of the armature. In fact, it has been found that this retardation may be and generally is sufficient to very seriously impair the efficiency of the machine. It may be corrected or neutralized in its effects and the trouble due thereto avoided by the employment in the circuit of a condenser of suitable capacity; but when the whole of the energy to be transmitted must pass through the condenser the latter becomes a large and costly adjunct and the apparatus as a whole becomes less available for general service. It will be understood that if on the armature a second winding were applied symmetrical with the first, but in which the current passes in a direction opposite to that of the current of the first, that no self-induction, and in consequence no lag, would result. With both windings attached to the armature-core, however, no effective torque would be developed, as it will readily be seen that each winding or coil would be impelled in an opposite direction. If, however, only one of such windings be made fast to the revolving armature-core while the other is fixed in space, the maximum torque is secured, while the self-induction is reduced to a minimum, since the two windings, as before, will neutralize one another, so far as self-induction is concerned, while the stress due to the field will be transmitted from but one of them to the core. It is not necessary that the two windings should be exactly alike, if only the magnetizing effects shall be approximately equal and opposite.

In direct-current motors and generators a somewhat similar disposition of coils to that above described has been employed to neutralize the magnetism imparted by the armature-coils and for the purpose of preventing change of lead; but as we propose to deal only with alternating-current machines we place our coils exactly parallel to the field magnetization and organize them so that they serve as anti-induction rather than anti-magnetization coils and close them upon themselves, so that they will be acted upon inductively by the moving armature-coils and, by the current generated therein, tend, so to speak, to check the rise of magnetism in the armature rather than its ultimate development.

The invention therefore consists in the combination, in a machine of the kind described, with the rotating armature and coil or coils thereon, of a stationary coil or coils closed upon itself or themselves, adapted to produce an effect approximately equal but opposite to that of the coil carried by the armature, whereby the self-induction and consequent retardation in the armature will be neutralized or overcome.

The plan or means by which the invention is carried out is illustrated in the accompanying drawings.

Figure 2:
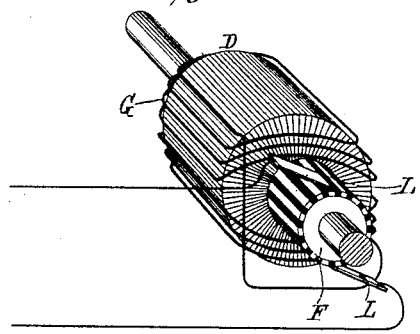
Figure 3:
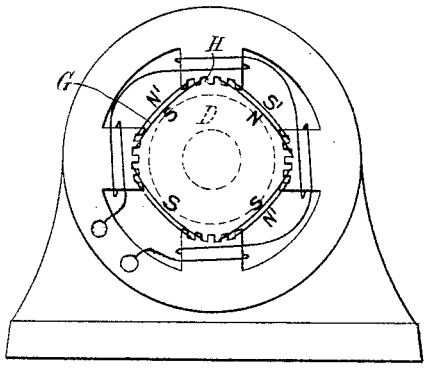

Figure 1 is an end view of a motor embodying the invention. Fig. 2 is a perspective view of an armature, exhibiting, diagrammatically, the special winding which the invention involves. Fig. 3 is an end view of a multipolar field-magnet with the improvements applied to the same.

In Fig. 1, A A represent the field-core of any ordinary motor; B B, the polar projections between which the armature is mounted, and C C the energizing field-coils surrounding such polar projections. D is the armature-core, E the coils wound thereon, and F is the usual commutator. G designates the stationary coil. This coil is wound in convolutions parallel to those on the armature and are conveniently contained in recesses or grooves H, cut or formed in the faces of the pole-pieces.

The relations of the two armature-coils are better illustrated in Fig. 2. The armature D in this case is wound in the usual way, with a conductor laid parallel with its axis in coils connected with the segments of the commutator F. The line of commutation is shown by the position of the brushes L L and the stationary coil G is shown as surrounding the armature, its convolutions being in planes at right angles to the line of commutation.

In Fig. 1 the armature and field coils are in series and the stationary coil is closed upon itself. The stationary coil is shown more clearly in Figs. 2 and 3 as having its ends connected together, the coil being thus in closed circuit.

In Fig. 3 the field-core is provided with a number of pole-pieces, being, in fact, a type of multipolar machines. The stationary coils in this case are wound in grooves in adjacent pole-pieces, so as to produce an opposite magnetizing effect upon or in the armature to that of the armature-coils. For example, if the tendency of an armature-coil is to produce a north pole in its core at any given point, as N, the corresponding stationary coil will have an equal tendency to setting up at the same point an opposite pole. So, in general, where the armature-coils act to establish poles N S the stationary coils neutralize such action by establishing poles S' N', as indicated in the diagram. The stationary coils G, it will be observed, do not sensibly affect the magnetic conditions of the field, owing to their position relatively thereto; but their magnetizing influence is manifested in the armature-core, where it opposes that of the armature-coils.

In practice the conductors of the supplemental or stationary coil or coils will be bent aside at one or both ends of the armature to permit the latter to be introduced in or withdrawn from the field-magnets, as is indicated in Fig. 1.

This invention is more particularly applicable to and useful with motors; but it may be used to advantage, when the machine is run as a generator, for preventing lagging of the current.

What we claim is—

1. The combination, with the armature of an alternating-current motor and the energizing-coils wound thereon, of a stationary coil closed upon itself and having its conductors or convolutions substantially parallel to those of the armature-coil, whereby the self-induction of the armature will be neutralized, as set forth.

2. The combination, with the armature of an alternating-current motor having a commutator to which the coils wound on the armatur are connected, of a stationary coil closed upon itself and having its conductors or convolutions substantially parallel to those of the armature-coil, whereby the self-induction of the armature will be neutralized, as set forth.

WILLIAM STANLEY, JR.
JOHN F. KELLY.

Witnesses for Stanley:
SAMUEL E. ROBINSON,
JOHN F. VAN DEUSEN.

Witnesses for Kelly:
REGINALD A. FESSENDEN,
T. E. THEBERATH.